(12) United States Patent
Tucker et al.

(10) Patent No.: US 8,438,100 B2
(45) Date of Patent: May 7, 2013

(54) INVESTMENT FUNDS ENABLING A BOND LADDERING STRATEGY

(75) Inventors: Matthew Tucker, Orinda, CA (US);
Steve Laipply, San Francisco, CA (US)

(73) Assignee: BlackRock Fund Advisors, San Francisco, CA (US)

( * ) Notice: Subject to any disclaimer, the term of this patent is extended or adjusted under 35 U.S.C. 154(b) by 6 days.

(21) Appl. No.: 12/965,788

(22) Filed: Dec. 10, 2010

(65) Prior Publication Data

US 2011/0166983 A1    Jul. 7, 2011

Related U.S. Application Data

(60) Provisional application No. 61/285,306, filed on Dec. 10, 2009.

(51) Int. Cl.
*G06Q 40/00* (2006.01)
(52) U.S. Cl.
USPC ............................. 705/37; 705/35; 705/36 R
(58) Field of Classification Search ............... 705/35, 705/36 R, 37
See application file for complete search history.

(56) References Cited

U.S. PATENT DOCUMENTS 8,103,580 B2 * 1/2012 Sato et al. .................. 705/37
2007/0083457 A1 * 4/2007 Evelyn et al. ............... 705/37

\* cited by examiner

*Primary Examiner* — Ojo O Oyebisi
(74) *Attorney, Agent, or Firm* — Fenwick & West LLP

(57) ABSTRACT

An open-ended fund, such as an ETF, holds fixed-income securities and has a liquidation date. An order management system receives buy orders from a plurality of investors for purchasing shares of the fund receives and sell orders from a plurality of investors for selling shares of the fund. A fund management information system determines a yield for each investor based on the shares of the fund purchased by the investor and the fixed-income securities held by the fund at the time that the shares were purchased. The fund management information system also determines a plurality of distribution payments and a final liquidation payment for each investor so that the distribution payments and the final liquidation payment provide the yield determined for the investor when the investor purchased shares of the fund. This enables investors to use the fund in a bond laddering strategy.

16 Claims, 2 Drawing Sheets

INVESTMENT FUNDS ENABLING A BOND LADDERING STRATEGY

CROSS REFERENCE TO RELATED APPLICATIONS

This application claims the benefit of U.S. Provisional Application No. 61/285,306, filed Dec. 10, 2009, which is incorporated by reference in its entirety.

BACKGROUND

This invention relates generally to financial services and products, and more particularly to financial systems that enable an investor to create bond laddering strategies, and other strategies that typically involve individual fixed-income securities, through a series of open-ended funds (such as exchange traded funds or mutual funds) that hold fixed-income securities.

Bond laddering is an investment technique in which an investor purchases multiple bonds (or other types of fixed-income securities) having different maturity dates. As an example, the total investment is divided equally among several maturity dates that are spread at regular intervals over a period of time (e.g., every year for a period of ten years). In this way, the bonds associated with each particular maturity date are a "rung" of the total investment "ladder." Bond laddering has a number of benefits for investors. For example, an investor may avoid capital losses (or gains) due to fluctuations in interest rates by simply holding onto the bonds until the maturity dates arrive, at which time the investor can purchase a new rung for the bond ladder. By having a series of investments that mature over regular intervals, a bond ladder provides more stability around yields and periodic liquidity for the investor.

A bond laddering strategy may also minimize risks to the investor. For example, in an environment where interest rates are increasing, a bond ladder prevents the investor from being stuck with a low interest rate for a long time, thereby allowing the investor to benefit from the returns associated with increasing rates. On the other hand, when interest rates are decreasing, the division of the investment across several rungs of the bond ladder means that only one portion of the total bond investment (i.e., one rung of the ladder) will mature at any given time. Accordingly, if interest rates are relatively low but the investor desires to repurchase more bonds when a rung matures, only a fraction of the total portfolio will consistent of the bonds at the lower-yielding rate. As one can appreciate, by spreading out the maturity dates of the fixed-income securities over time, the ladder structure smoothes the risks associated with investing in fixed-income securities in an environment where interest rates can fluctuate.

Investors commonly invest in different types of funds to gain exposure to various types of securities, including bonds and other fixed-income securities. A very popular type of fund is an exchange-traded fund, or ETF. Shares of an ETF are securities that represent a legal right of ownership over an underlying portfolio of securities or other assets held by the issuing fund. The assets held by an ETF may include individual stocks, bonds, cash, commodities, derivatives, or any tradable asset, including contracts based on the value of any of the foregoing. Shares of an ETF are designed to be listed on a securities exchange and traded over the exchange just like other securities. ETFs thus allow an investor to own a set or "basket" of assets by simply purchasing shares in the individual ETF. Many existing ETFs hold a mix of assets that aim to replicate or otherwise match the characteristics of a particular published index. These ETFs allow investors to have exposure to the index by purchasing shares of the single ETF. Because of their low cost and tax advantages, ETFs have grown in popularity in recent years.

A typical ETF resembles an index mutual fund in that an ETF generally holds a basket of securities designed to replicate the returns of a securities index and is required to permit daily redemptions at the current value of its holdings (also known as "Net Asset Value"). But unlike mutual funds, ETF shares trade on an exchange throughout the trading day, and most investors buy and sell shares on the exchange rather than direct purchases and redemptions from the fund itself (as is the case with mutual funds). Unlike mutual funds, most transactions in ETF shares are conducted in the secondary market (i.e., on an exchange) and do not involve the movement of assets in or out of the fund. In the case of transactions in creation units that do involve the movement of assets into or out of the fund, the transactions are routinely effected by giving the redeeming shareholder their pro rata share of the fund's holdings, which does not impose trading costs or adverse tax consequences on the remaining shareholders.

Although there are many ETFs that hold bonds, existing ETF products are perpetual in nature and therefore do not enable investors to implement strategies that rely on a maturity structure such as bond laddering. Other types of funds that may hold bonds (including open-ended funds, such as mutual funds) similarly do not enable an effective bond laddering strategy. Aside from the lack of a liquidation date, this limitation is, at least in part, due to the open-ended nature of these funds. A bond laddering strategy typically relies on the ability to buy and hold a fixed-income security until its maturity date, thus allowing an investor to lock in a specific yield for each rung of the bond ladder. But with traditional open-ended funds like ETFs, there is no liquidation date and no limitation on investors' ability to enter or leave the fund, which may require the fund to buy or sell the underlying bonds when investors buy or sell shares of the fund. The lack of a liquidation date coupled with the buying and selling of the underlying bonds while interest rates are changing may result in a net change of the yield of the underlying funds and result in uncertainty for investors around the value of their investment at liquidation. These attributes have prevented traditional open-ended funds from creating a constant yield experience for each investor in the fund. As such, existing open-ended funds are unacceptable for strategies which rely upon a liquidation date and expected yield such as bond laddering.

Accordingly, it would be desirable to provide a fund management information system 110 that solves these problems by offering and managing open-ended funds (such as ETFs) that have properties allowing the funds to be used by investors to create and pursue other applications typically associated with individual fixed income securities such as bond laddering strategies.

SUMMARY

Embodiments of the invention described herein relate to a set of ETFs that possess liquidation dates (i.e., the funds de-list, liquidate and distribute proceeds to investors of record on or about a pre-specified date). However, these techniques and fund management information system $110s$ may be used to manage and offer other types of funds, such as mutual funds, which invest in fixed-income securities and can be purchased by investors to give the investors exposure to those fixed-income securities. Moreover, various types of bonds (e.g., corporate or municipal bonds) may be used as the underlying investment, and instead of bonds the funds may invest in different types of fixed-income securities or other investments having properties similar to fixed-income securities. Accordingly, the example embodiments described herein of an ETF that holds bonds is provided for illustration and not to limit the scope of the inventive concepts.

In one embodiment, to enable a bond laddering investment strategy using ETFs, a fund manager offers a family of ETFs. Each ETF in the family invests in bonds that mature on or about the same maturity date, and the maturity dates of the underlying bonds associated with each ETF are spread over time, preferably evenly. For example, in 2010, a fund manager may offer ten ETFs, one for each year starting from 2011 and going until 2020. Since the underlying bonds for a particular ETF mature at approximately the same time, each ETF can be invested in as a rung of the bond ladder, and investors are free to invest in the rungs as they see fit. After all bonds in the ETF have matured, the ETF closes and liquidation proceeds are distributed out to investors.

Because investors may enter or leave the ETFs by buying or selling shares, shares of the ETF may be created or redeemed (to accommodate the buying or selling) in a market where interest rates may be changing. A fund management information system 110 is provided to monitor and manage the end-date ETF structure. In particular, the fund management information system 110 tracks the distributions, cash flows, and NAV of each ETF over time and also provides projections of future distributions, cash flows and final end date value based upon certain assumptions. If desired, the fund management information system 110 could balance the cash flows from the underlying bond holdings with the interim monthly and final end date distribution of the ETF in order to provide a specific cash flow profile. As a consequence of the end-date structure, each investor in the ETF should (approximately) realize the yield that existed when the investor entered the fund, which enables the ETF to be used as a rung in a bond laddering investment strategy. A variety of cash flow profiles could result in similar yield profiles on a pre-tax basis. The fund management information system 110 allows for the evaluation of these cash flow profiles.

In one embodiment, each ETF holds substantially all bonds having the same maturity date. However, the ETFs may hold bonds that expire on different but generally about the same date. Additionally, the ETFs may also hold relatively small portions of their assets in other items, such as cash or securities other than bonds with the same maturity date. These additional assets may be necessary for management of the ETFs, such as for holdings between creation or redemption transactions or for distribution payment or efficiency reasons.

In another embodiment, each ETF may hold a range of bonds with different maturity dates. Such an ETF may represent a pre-packaged bond ladder, delivering to an investor multiple ladder "rungs" within a single ETF. The ETF may also obtain its bond exposure either by purchasing individual fixed income securities or by buying specific ETFs that represent specific ladder rungs.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System for Administering Funds for Bond Laddering

Figure 1:
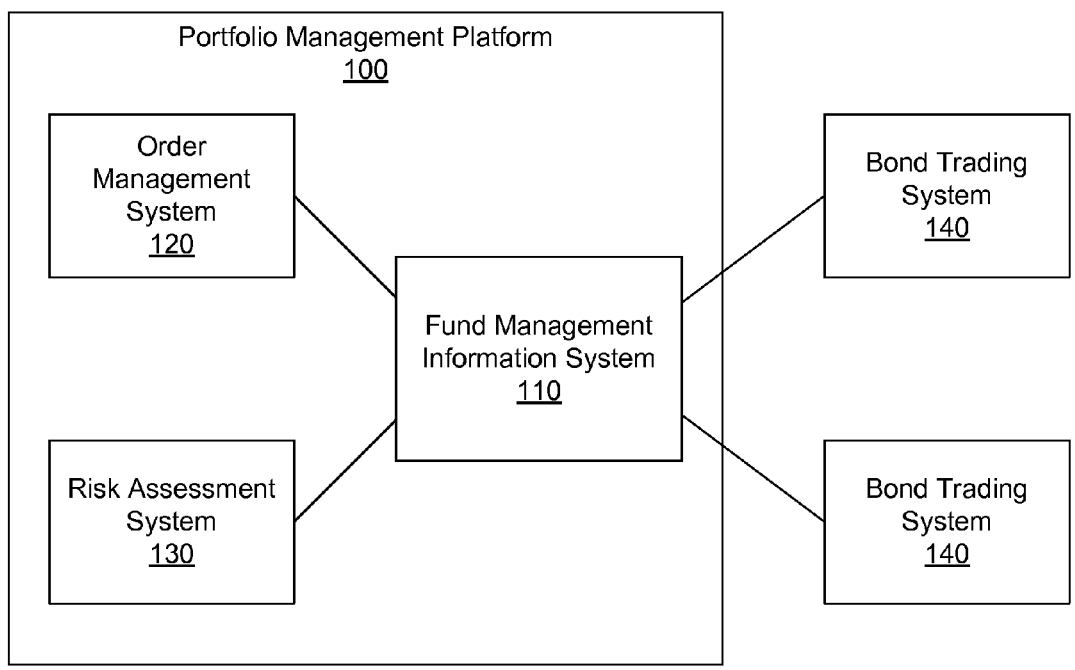
FIG. 1 is a block diagram of a fund management information system 110 for implementing one or more ETFs for a bond laddering strategy, in accordance with an embodiment of the invention.

FIG. 1 illustrates a fund management information system 110 for implementing one or more ETFs for a bond laddering strategy. As illustrated, a portfolio management platform 100 communicates with an order management system 120 to receive and confirm orders from investors for the creation or redemption of shares of one or more of the family of ETFs that provides the rungs of the bond ladder.

The fund management information system 110 allows for the assessment of the impact of ETF creations and redemptions on a portfolio, and the evaluation of the impact of trade orders to facilitate portfolio rebalancing. The system 110 also projects future ETF distribution payments and end date liquidation value and allows for the analysis of the tradeoff between the two. This includes scenario analysis involving potential future interest rate and fund growth scenarios. Another component of the portfolio management platform 100 is a risk assessment system 130 that calculates risk information about the underlying bonds or other fixed-income securities that are held by the ETFs or that a fund manager may consider purchasing to be held by one of the ETFs. Risk characteristics calculated and analyzed include interest rate risk (duration), yield, and credit quality. These risk characteristics are used by the fund management information system 110 in its calculations.

The portfolio management platform 100 also communicates with one or more bond trading systems 140 to purchase or sell the underlying bonds for the ETFs. In one embodiment, the fund management information system 110 informs the creation of trade orders which are routed through the portfolio management platform 100 out to a bond trading system 140. Executions are routed back into the portfolio management platform 100 to facilitate trade confirmation, accounting, and the re-calculation of ETF portfolio risk. Portfolio trades can be affected through an electronic trading platform or through verbal orders as is common in over the counter markets.

Management of Each Fund "Rung"

To provide a set of ETFs that can be used for creating a bond ladder, in one embodiment, a fund manager offers a series of ETFs, where each ETF holds bonds having a particular maturity date or range of maturity dates. This section describes how a particular one of the ETFs in the family are managed during the life of the ETF, which serves as a rung of the bond ladder. In general, a liquidation date for the ETF is selected, and the fund manager ensures that the ETF holds substantially only bonds that expire on our around that liquidation date.

Periodically (generally daily) the order management system 120 publishes a list of securities that will be accepted into the ETF in exchange for the creation of new ETF shares. One decision that is informed by the fund management information system 110 is what securities to accept via in-kind transfer. In some instances, where there is equal demand and supply in a secondary market, the ETF shares may be traded there, in which case no creation or redemption would occur. However, when there is more demand for the ETF shares new ETF shares may need to be created. As part of this process, the fund management information system 110 may assist in determining which bond securities will be accepted by the ETF. As described, the bonds should generally have the same maturity dates as the other underlying bonds in the fund, and they should generally match the risk profile that has been established for the fund. The total value of the securities and cash taken into the fund via in-kind will equal the value of new shares issued to investors.

Conversely, when existing investors in the fund wish to sell their shares, this may occur on the secondary market or via the ETF redemption process. When an ETF redeems shares, the fund management information system 110 may assist in selecting which of the underlying basket of bonds or other fixed-income securities will be delivered out in-kind. This decision may be based on various questions of trading liquidity, for example, to ensure that both those bond positions redeemed out and those bond positions that remain in the fund are tradable in the secondary market. In addition, the nature of the bonds held by the ETF may affect tax consequences, e.g., if the ETF holds municipal bonds.

It should be noted that although the purchasing and selling of shares of the ETF are referred to as new or existing investors, the fund is agnostic as to the identity of the investors. The fund management information system 110 tracks a particular creation or redemption, and treats each instance of a creation or redemption as a separate investor, regardless of whether the same individual or entity was involved in the transaction.

The underlying bonds of the ETF may provide both distribution payments and a final maturity payment, but in other embodiments either of the distribution or maturity payments may be zero, depending on the nature of the bond. As the underlying bonds owned by the ETF provide payments to the fund, the fund manager distributes these payments to the investors who own shares of the fund. Based upon the legal and tax structure of the fund an investor may receive a pass through of actual payments made by the bonds in the portfolio, a distribution of earned income from the portfolio, or some other variation. Based upon the dynamics of the fund (e.g., changes in portfolio holdings, creation/redemption activity, changes in interest rates, etc.), the fund management information system 110 projects the balance of monthly distributions and final liquidation value payment. The yield for each investor approximately corresponds to a yield that was expected when the investor purchased the fund, so the yield attained may be (and typically is) different for different investors.

The fund management information system 110 can employ a number of different strategies for balancing or allocating the monthly distributions and final liquidation payment. It can also be appreciated that the fund management information system 110 would determine this balancing iteratively, responsive to real world changes in investor flows and in interest rates. For example, the fund management information system 110 may determine an expected distribution and liquidation payment schedule, but this may change as interest rates change and investors create and/or redeem shares of the ETF. Accordingly, the balance of the distribution payments and liquidation payments may be dynamic, but the realized yield for each investor should be largely maintained.

In one embodiment, the fund management information system 110 adjusts the distribution payments to glide into a desired liquidation payment, which in one embodiment is equal to the par value of the underlying bonds. This strategy may potentially reduce capital gains or losses, which may or may not be considered desirable in a bond ladder strategy. However, the fund management information system 110 may also take into account the tax consequences that may arise from the increased distribution payments that are necessary to reduce the ultimate liquidation payment.

In another strategy, the fund management information system 110 may use all or a portion of the distribution payments to purchase additional bonds, thereby increasing the liquidation payment. Conversely, the fund management information system 110 may sell existing bonds held by the fund in order to increase the distribution payments relative to the liquidation payment. These strategies may result in various combinations of income and capital gains and losses and the attendant tax consequences, which may or may not be desirable to the investors.

Overview of Typical ETF Creation, Redemption, and Trading on a Secondary Market

Figure 2:
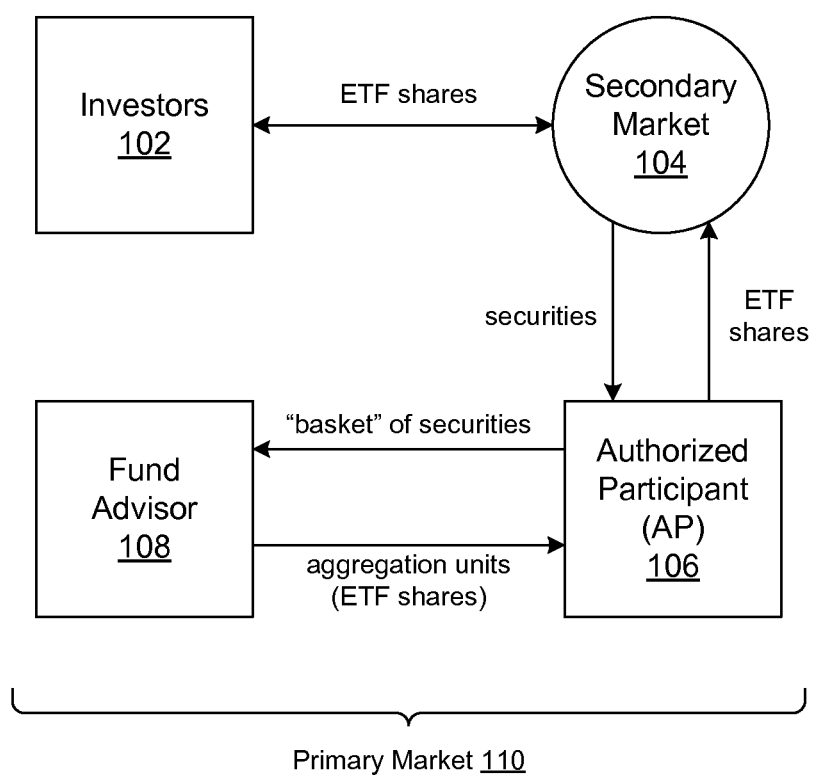
FIG. 2 illustrates a process for creating an ETF in a primary market and trading shares of the ETF in a secondary market, in accordance with an embodiment of the invention.

The shares of an ETF are generally made available to investors 102 through a two-tiered market structure, which includes a primary market 110 and a secondary market 104. FIG. 2 illustrates a simplified creation process for an ETF (or "fund"), in the primary market 110 in accordance with one embodiment. In the primary market 110, issuance of new shares of the ETF can be created only in multiples of a minimum block of shares ("creation units"). Because of the large size of the minimum creation units required for purchases of new ETF shares, these shares are generally only available in the primary market 110 to certain institutional investors known as authorized participants 106. Authorized participants 106 are typically large institutional broker dealers or market makers that transact directly with an ETF for purchases of creation units of the ETF shares at the end of day net asset value ("NAV") for the ETF.

As shown, the consideration for purchase of a creation unit of an ETF generally consists of a deposit of a basket of securities via an in-kind exchange of those securities and a deposit of cash to make up any difference between the value of the deposit securities delivered into the ETF and the value of the shares of the ETF (or NAV) issued by a fund advisor 108 to the authorized participant 106. In certain limited circumstances, cash may also be delivered in lieu of all or a portion of the specified basket of securities if the securities are not available in sufficient quantity or otherwise cannot be delivered or in certain other situations. The deposit securities are obtained and delivered by the authorized participant 106 to the fund, which are then added to the fund's holdings. The particular mix of securities to be deposited by the authorized participant 106 in exchange for the creation units are specified by a "basket," which is published by the fund advisor 108 each business day in a portfolio composition file (PCF).

The opposite process occurs for a redemption of the ETF. In one embodiment, an authorized participant 106 can redeem shares of an ETF by delivering a block of the ETF shares (e.g., the same size block as in a creation unit) to the fund. In exchange, the fund delivers via an in-kind transfer the deposit securities specified in the published basket (e.g., in the PCF) associated with the ETF. In both the creation and redemption processes, a cash component is delivered in either direction to offset any differences between the actual value of the deposit securities and that of the ETF shares exchanged. As stated earlier, in certain limited circumstances, cash may also be delivered in lieu of all or a portion of the specified basket of securities if the securities are not available in sufficient quantity or otherwise cannot be delivered or in certain other situations.

In contrast to the primary market 110, in which authorized participants 106 may transact for the creation or redemption of creation size units of an ETF, individual investors 102 can access ETF shares in the secondary market 104. Once the block of ETF shares in the creation size units is received by the authorized participant 106, the shares may be broken down into less than creation unit sizes (including individual shares) and sold by the authorized participant 106 directly to customers or over a secondary market 104, where individual investors 102 may buy and sell shares of the ETF through their brokerage accounts. An intermediary, such as a broker/dealer or financial advisor, may advise investors 102 directly and recommend and sell the ETF shares.

The process flow and systems for trading ETFs are described in more detail in U.S. application Ser. No. 12/168,036, filed Jul. 3, 2008, and in U.S. Provisional Application No. 61/142,609, filed Jan. 5, 2009, each of which is incorporated by reference in its entirety.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for administering a fund for use in a bond laddering strategy, the method comprising:
   holding a plurality of fixed-income securities by a manager of the fund;
   electronically receiving at an order management system a plurality of buy orders from a plurality of investors for purchasing shares of the fund, wherein the orders are received during different times before a liquidation date of the fund;
   determining, by a fund management information system, a yield for each investor based on the shares of the fund purchased by the investor and the fixed-income securities held by the fund at the time that the shares were purchased;
   electronically receiving at the order management system a plurality of sell orders from a plurality of investors for selling shares of the fund, the orders received during different times before the liquidation date of the fund;
   determining, by the fund management information system, a plurality of distribution payments and a final liquidation payment for each investor so that the distribution payments and the final liquidation payment provide the yield determined for the investor when the investor purchased shares of the fund;
   paying the investors the determined distribution payments at intervals before the liquidation date of the fund; and
   paying the investors the final liquidation payment upon the liquidation date of the fund.

2. The method of claim 1, wherein the fixed-income securities are liquidated upon the liquidation date of the fund.

3. The method of claim 1, wherein the fund is an exchange traded fund (ETF).

4. The method of claim 3, further comprising:
   creating shares of the ETF responsive to receiving buy orders from the investors.

5. The method of claim 3, further comprising:
   redeeming shares of the ETF responsive to receiving sell orders from the investors.

6. The method of claim 1, wherein the fund is a mutual fund.

7. The method of claim 1, further comprising:
   communicating with one or more trading systems to purchase or sell fixed-income securities responsive to the buy or sell orders.

8. The method of claim 1, wherein the fixed-income securities comprise bonds.

9. The method of claim 1, wherein the fund holds substantially all bonds having about the same maturity date.

10. The method of claim 1, wherein at least one of the distribution payments and the final liquidation payments are zero.

11. The method of claim 1, wherein the distribution payments are determined to achieve a desired final distribution payment.

12. The method of claim 1, wherein the distribution payments and the final liquidation payment are determined to reduce capital gains or losses for the investors.

13. The method of claim 1, wherein the distribution payments are used to purchase additional fixed-income securities for the investor, thereby increasing the final liquidation payment to the investor.

14. The method of claim 1, wherein the distribution payments for an investor are increased by selling the fixed-income securities.

15. A system for administering a fund for use in a bond laddering strategy, the system comprising:

an account for holding a plurality of fixed-income securities;

an order management system for:

electronically receiving at an order management system a plurality of buy orders from a plurality of investors for purchasing shares of the fund, wherein the orders are received during different times before a liquidation date of the fund, and electronically receiving at the order management system a plurality of sell orders from a plurality of investors for selling shares of the fund, the orders received during different times before the liquidation date of the fund; and a fund management information system for:

determining a yield for each investor based on the shares of the fund purchased by the investor and the fixed-income securities held by the fund at the time that the shares were purchased, determining a plurality of distribution payments and a final liquidation payment for each investor so that the distribution payments and the final liquidation payment provide the yield determined for the investor when the investor purchased shares of the fund, paying the investors the determined distribution payments at intervals before the liquidation date of the fund, and paying the investors the final liquidation payment upon the liquidation date of the fund.

16. The system of claim 15, wherein the fund is an exchange traded fund (ETF).

* * * * *